United States Patent
Tanaka et al.

(10) Patent No.: US 7,098,777 B2
(45) Date of Patent: Aug. 29, 2006

(54) ELECTRONIC EQUIPMENT COMMUNICATIONS SYSTEM AND REPEATER

(75) Inventors: Makoto Tanaka, Tokyo (JP); Hiroyuki Nakazawa, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 649 days.

(21) Appl. No.: 09/794,759

(22) Filed: Feb. 27, 2001

(65) Prior Publication Data
US 2001/0027131 A1 Oct. 4, 2001

(30) Foreign Application Priority Data
Mar. 1, 2000 (JP) .............................. 2000-055749

(51) Int. Cl.
*H04B 3/36* (2006.01)
*A63F 9/24* (2006.01)

(52) U.S. Cl. ........................ 340/425.1; 463/43; 463/47; 273/148 B (58) Field of Classification Search ............ 463/43–45, 463/47; 340/425.1; 273/148 B
See application file for complete search history.

(56) References Cited
U.S. PATENT DOCUMENTS
4,596,390 A * 6/1986 Studley ..................... 463/47
5,607,157 A * 3/1997 Nagashima ................. 463/37
5,785,597 A * 7/1998 Shinohara ................... 463/43
2001/0009564 A1 7/2001 Goto et al.

FOREIGN PATENT DOCUMENTS

| EP | 0 723 233 A1 | 7/1996 |
|---|---|---|
| EP | 0 725 352 A1 | 8/1996 |
| EP | 0 796 643 A1 | 9/1997 |
| JP | 08-191951 | 7/1996 |

* cited by examiner

*Primary Examiner*—Daniel Swerdlow
(74) *Attorney, Agent, or Firm*—Katten Muchin Rosenman LLP (57) ABSTRACT

An electronic equipment communications system consists of electronic equipment and at least one or more control terminals and external storage devices connected via a repeater. Communications between the repeater and electronic equipment is performed by an external storage device communications system that connects the entertainment system to external storage devices connected to the external storage device connectors of the repeater, and control signals output from the electronic equipment are input to the repeater via this external storage device communications system. The data rate of the external storage device communications system is higher than that of the control terminal communications system, so high-speed switching of the repeater can be implemented by control signal from the electronic equipment.

7 Claims, 6 Drawing Sheets

ELECTRONIC EQUIPMENT COMMUNICATIONS SYSTEM AND REPEATER

FIELD OF THE INVENTION

The present invention relates to an electronic equipment communications system wherein electronic equipment and one or more control terminals and external storage devices are connected to the electronic equipment via a repeater.

BACKGROUND OF THE INVENTION

Conventionally, standard home entertainment systems and other electronic equipment consist of controllers or other control terminals connected to the system, and various types of data regarding the control environment of the control terminals and the progress in a game being executed by the entertainment system are stored in memory cards or other external storage devices connected to the system. However, in order for a plurality of people to play a game simultaneously, there is a known method whereby the control terminals are not connected directly to the entertainment system, but rather a repeater is connected to the entertainment system so it is possible for a plurality of control terminals to be connected simultaneously to this repeater, which repeater is then connected to a control terminal. By using such a repeater, a plurality of control terminals can be connected to one repeater, so a plurality of people are able to play games with the entertainment system, giving an advantage in the diversity of games.

However, in such a prior art electronic equipment communications system wherein a plurality of control terminals can be simultaneously connected to the entertainment system via a repeater, the external storage device is conventionally connected directly to the entertainment system. Therefore, when data for each control terminal is stored individually in the external storage device, there is a problem in that it is necessary to divide the storage area of the external storage device and store data individually in each storage area, or reconnect the external storage device for each control terminal, and thus it may not be possible to allocate sufficient storage, or it may be necessary to reinsert the external storage device for each control terminal.

For this reason, technology has been proposed whereby a number of external storage device connectors corresponding to the number of control terminal connectors are provided, and by connecting a number of external storage devices corresponding to the number of connected control terminals, the complexity of reinserting the external storage device is reduced and storage area is provided for each control terminal as described in unexamined Japanese patent application No. JP-A-H8-191951. In the technology disclosed in the '191951 publication, by connecting the system-side connecting plug provided on the repeater to the control terminal connector of the entertainment system, communication among the electronic equipment, control terminals and external storage devices via the repeater is implemented. However, in such prior art disclosure, the electronic equipment and repeater are connected by control terminal connectors, so the control signals output from the electronic equipment are input to the repeater via the communications system used for control terminals including this control terminal connector. There are several problems inherent with such an arrangement.

First, the electronic equipment of the communications system used for control terminals is not normally provided with circuitry for suppression of unwanted radiation, so there is a problem in that the data rate of this communications system is extremely slow. Specifically, while the data rate between the electronic equipment and external storage device is roughly 24 Mbps, the data rate between the electronic equipment and control terminal is usually a maximum of 500 kbps. Accordingly, when switching control of the repeater is performed by means of a control signal output from the electronic equipment to the communications system used for control terminals, the data rate is slow, so there is a problem that high-speed switching of the control terminal connector or external storage device connector in the repeater cannot be achieved. In addition, key input data from the control terminal is constantly broadcast to the electronic equipment so the data density is high, so on this point also, there is a problem in that high-speed switching of the control terminal connector or external storage device connector in the repeater cannot be achieved. In particular, as the central processing units of recent electronic equipment reach higher processor speeds, an electronic equipment communications system that is able to achieve high-speed switching of the control terminal connector or external storage device connector in the repeater is desirable.

It is an object of the present invention, therefore, to provide an electronic equipment communications system that is able to achieve high-speed switching of the control terminal connector or external storage device connector in the repeater, and a repeater and electronic equipment used therein.

Still other objects and advantages of the invention will become clear upon review of the following detailed description in conjunction with the appended drawings.

SUMMARY OF THE INVENTION

An electronic equipment communications system is provided wherein electronic equipment and at least one or more control terminals and external storage devices are connected via a repeater, wherein an external storage device communications system that performs communications between the external storage devices connected to said repeater and said electronic equipment, and a control terminal communications system that performs communications between the control terminals connected to said repeater and said electronic equipment are set up independently, and control signals output from said electronic equipment are input to said repeater via said external storage device communications system. The control signals output from the electronic equipment and input to the repeater ascertain the number of control terminal connectors and external storage device connectors provided on the repeater and select one of the control terminals or external storage devices with which communication is to be performed from among a plurality of control terminals or external storage devices connected to the repeater. Since a control terminal communications system and an external storage device communications system are set up independently, and control signals output from the electronic equipment are input to the repeater via the external storage device communications system, it is possible to implement high-speed communications between the electronic equipment and repeater.

Thus, the external storage device communications system does not require circuitry for suppression of unwanted radiation like the control terminal communications system, yet high-speed switching of the control terminal connector or external storage device connector in the repeater can be performed with no drop in the data rate. In addition, since the control signals from the electronic equipment are output to the repeater via the external storage device communications system with a data rate lower than that of the control terminal communications system, it is possible to make the communications between the electronic equipment and repeater more efficient, and it is also possible to perform high-speed switching of the control terminal connector or external storage device connector in the repeater.

DETAILED DESCRIPTION OF THE PREFERRED EMBODIMENTS

In general, the repeater of the present invention comprises:
a plurality of control terminal connectors connected to control terminals,
a plurality of external storage device connectors connected to external storage devices that are set corresponding to said control terminal connectors,
a control terminal communications switcher capable of selecting one of the at least one or more control terminals connected to said plurality of control terminal connectors and permitting communications between said control terminal and said electronic equipment,
an external storage device communications switcher capable of selecting one of the at least one or more external storage devices connected to said plurality of external storage device connectors and permitting communications between said external storage device and said electronic equipment, and
a communications controller that, based on a control signal from said electronic equipment, outputs a switching control signal to said control terminal communications switcher and said external storage device communications switcher.

Through use of such a repeater, a communications controller that performs switching control of the control terminal communications switcher and external storage device communications switcher is provided, so it is possible to achieve high speeds for not only the switching of the external storage device connector but also switching of the control terminal connector. In addition, while the present invention encompasses an electronic equipment communications system including electronic equipment and a repeater, the present invention may also encompass the repeater alone constituting an electronic equipment communications system, or electronic equipment alone.

In addition, with the repeater according to the present invention, various electronic equipment provided with control terminal connectors and external storage device connectors can be used, thereby greatly increasing the general-purpose nature of the repeater of the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Figure 1:
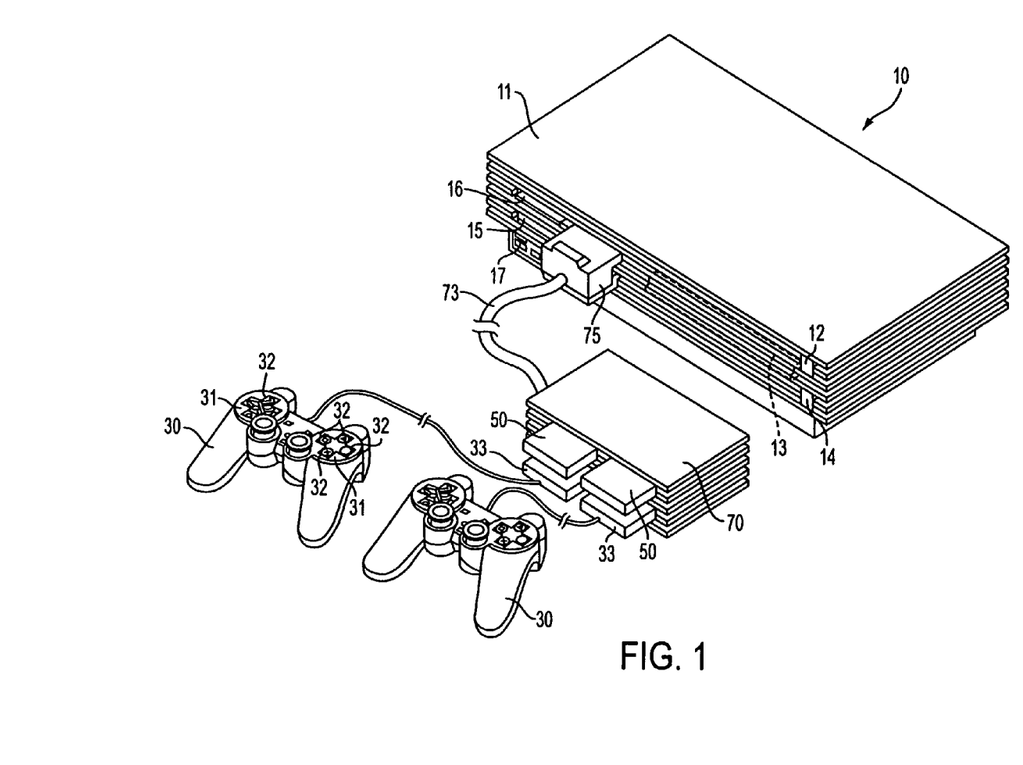
FIG. 1 is a perspective view of an electronic device in accordance with an embodiment of the present invention.

FIG. 1 illustrates electronic equipment consisting of an entertainment system 10, a plurality of controllers 30, each of which serves as a control terminal, a plurality of memory cards 50, each of which serves as an external memory device, and a repeater 70. The electronic equipment or entertainment system 10, which is conventionally connected with an audiovisual output device (not shown), has the function of reading games, images, and other application programs stored on an optical disk, etc., and executing said programs by displaying them on said audiovisual output device according to instructions given by the operator using a controller 30. The system 10 further comprises a main board, power source unit, disk device, and input-output signal control board (all not shown), which are housed inside case 11. The main board (not shown), which controls the system as a whole, has a control system (not shown) consisting of a CPU and its peripheral devices, a graphic system (not shown) that includes a GPU that draws images, and a sound system that plays music and sound effects, etc. The power source unit (not shown), which supplies power to the peripheral devices inside the entertainment device also supplies a power to the controller 30, memory card 50, and repeater 70, which are connected to the entertainment system 10. This power source unit can be manipulated by turning on the master switch (not shown) on the back of case 11 and operating switch 12 on the right side of case 11. The disk device, which plays CD-ROMs, DVD-ROMs, and other optical disks, has a main body that includes an optical pickup unit (not shown) arranged inside case 11 and a disk tray 13 by which to load an optical disk in the main body, with the end face of disk tray 13 being exposed on the front right side of case 11. The disk tray 13 is operated by switch 14 located beside the disk tray 13. The input-output signal control board (not shown) has an optical disk controller that controls the optical disk on which application programs are recorded, and a communication controller that performs communication between the entertainment device main body 10 and external devices. The optical disk controller has, for example, a decoder that decodes programs or data, etc. recorded with an appended error correction code, and a buffer that speeds up the reading of data from the optical disk by temporarily recording data from the disk device. Connected to the communication controller are controller connection 15 and card slot 16, which are arranged on the system 10 shown in FIG. 1 on the front left side of case 11 and, arranged below them, external equipment connection 17, which is USB compliant. The communication controller performs communication control with the external devices connected to these connections. Also provided on device main body 10 of FIG. 1 are a PCMCIA slot (not shown) and an audiovisual output terminal (not shown), and these too are connected to the communication controller and are similarly controlled.

As shown in FIG. 1, controller 30, which serves as a control terminal and outputs operation signals to the entertainment system 10, has a main body 31, control switches 32, which are preferably arranged on the top and side of controller main body 31, and a connector plug 33 for connecting with repeater 70 or entertainment system 10 directly. As an external memory storage device, memory card 50 has flash memory mounted on the board and a case that houses the board including this flash memory, and an electrically conductive pattern is formed on the end of the board as is known in the art. In other words, a card edge connector by which electrical connection is made is adopted as the connection structure of memory card 50, by inserting said board end into the prescribed socket, for example card slot 16 of entertainment device main body 10. The state of progress and settings of a game or other application can be recorded on this memory card 50, and when a game ends, signals are output from entertainment device main body 10 to memory card 50 in order to preserve the state. And when a game that has been paused is resumed at a later date, when entertainment device main body 10 starts, the information recorded on this memory card 50 is loaded or transferred into entertainment device main body 10.

Figure 2:
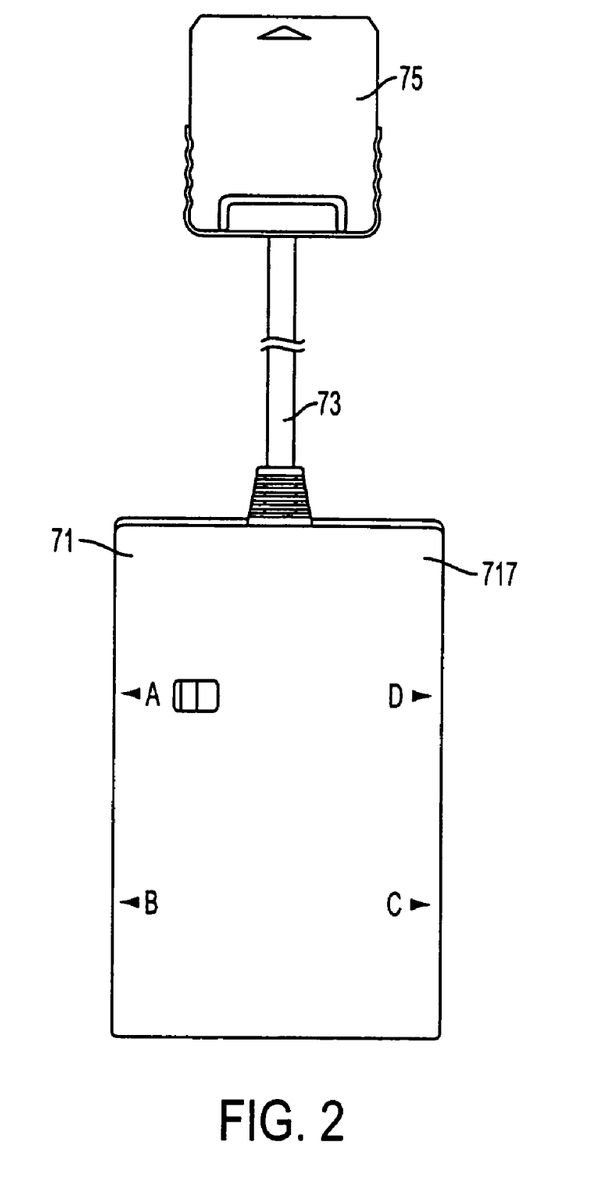
FIG. 2 is a top view of the repeater of the present invention.
Figure 3:
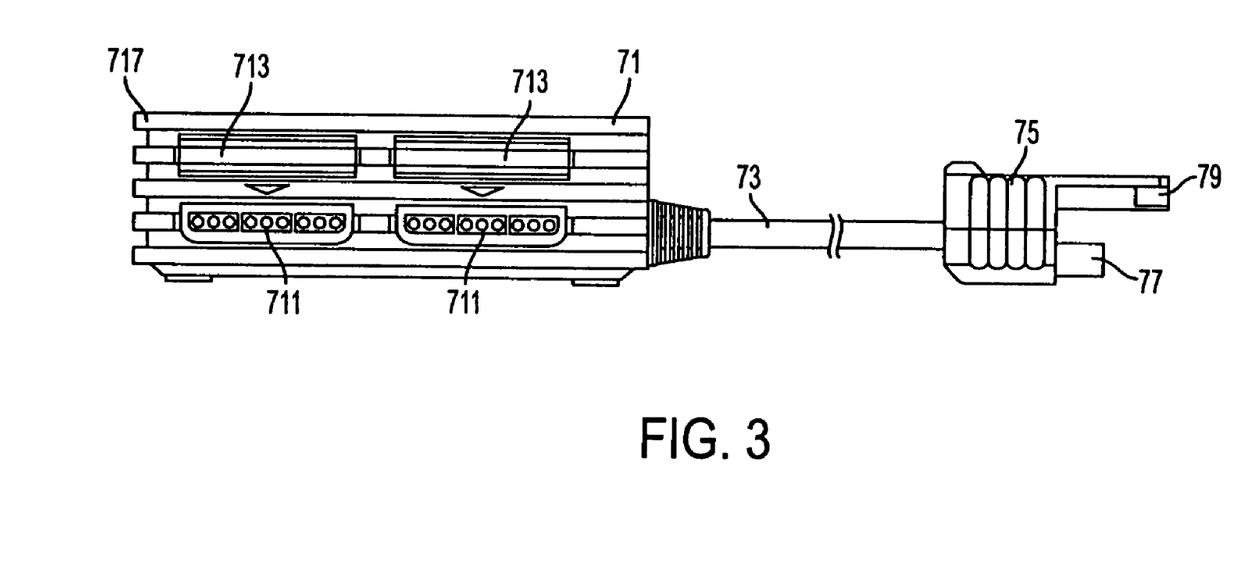
FIG. 3 is a side view of the repeater of FIG. 2.
Figure 4:
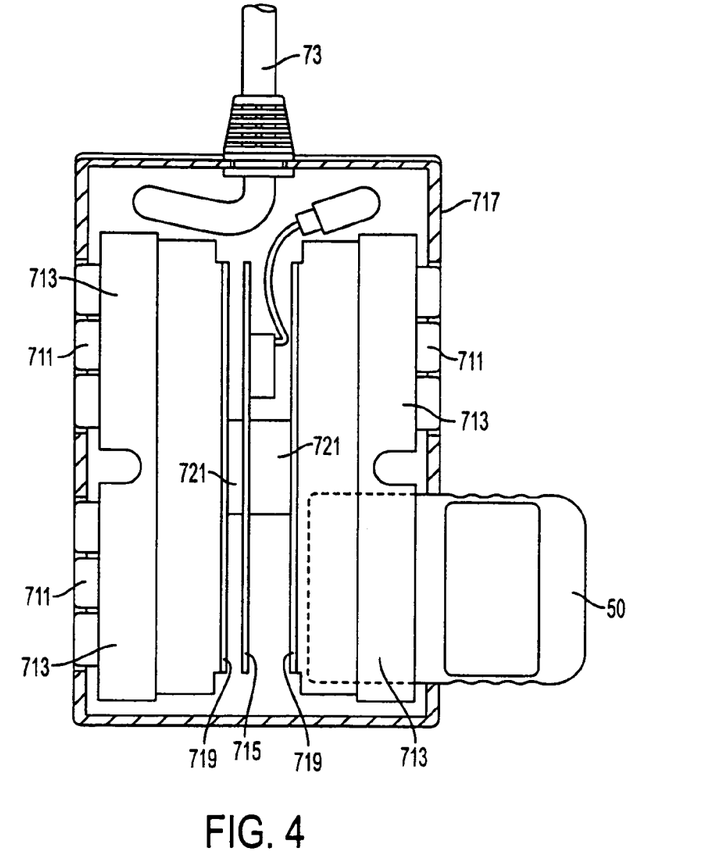
FIG. 4 is a horizontal cross-sectional view of the internal structure of the repeater of FIG. 2.

As shown in FIGS. 2–4, repeater 70 has a main body 71, cable 73, and a system-side connecting plug 75. Repeater main body 71 preferably consists of a cabinet 717 that houses four controller connections 711, four card slots 713 and control board 715. Each controller connection 711 has the same structure as controller connection 15 of entertainment device main body 10, and each card slot 713 has the same structure as card slot 16 of entertainment device main body 10. Attached to controller connections 711, which serve as the operation terminal connections, are connector plugs 33 of said controller 30 (see FIG. 1). Card slots 713, which serve as the external memory device connections, are provided at the top of controller connections 711 corresponding to the arrangement of said controller connections 711, and memory cards 50 are inserted and connected thereto. Such controller connections 711 and card slots 713 are attached on two boards 719, which are arranged approximately symmetrically about cable 73 in the center, i.e., the pair of controller connections 711 and the pair of card slots 713 are arranged mutually facing the back surface part, and this combination is arranged in two rows in a direction perpendicular to the facing direction (see FIG. 4). The two controller connections 711 and card slots 713 that constitute each row are electrically connected by boards 719, and are connected to control board 715 through connector 721.

Figure 5:
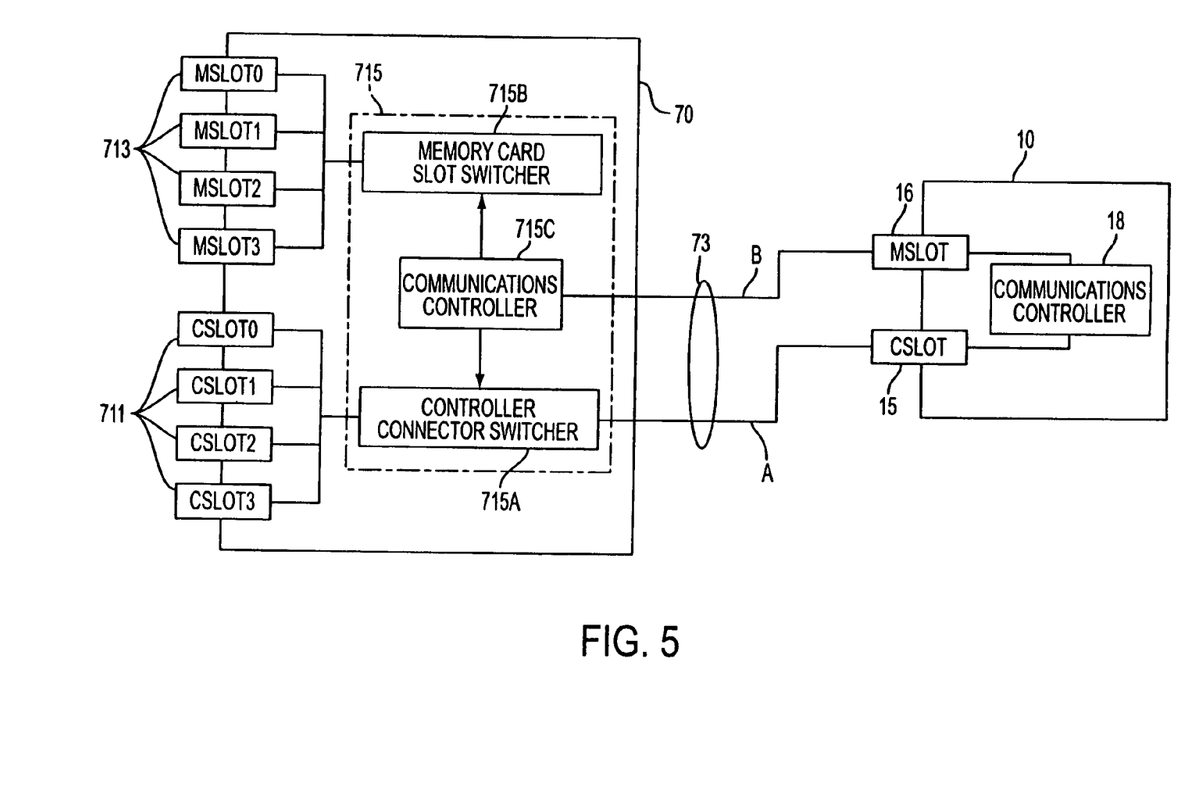
FIG. 5 is a block diagram of the structure of the communication systems of the repeater of the present invention.

As shown in FIG. 5, control board 715 has controller connection switcher 715A, which is electrically connected with controller connections 711, memory card slot switcher 715B, which is electrically connected with card slots 713, and communication controller 715C, which controls the communication of the switchers 715A and 715B. Controller connector switcher 715A is connected with any of the four controller connectors 711 and with controller connection 15 of entertainment system 10. Memory card slot switcher 715B is connected with any of the four card slots 713 and with card slot 16 of entertainment system 10. Communication controller 715C receives commands from entertainment system 10 and controls controller connection switcher 715A and memory card slot switcher 715B. This communications controller 715C comprises a controller body that outputs switching control signals to these switchers 715A and 715B along with two registers SP_REG (not shown) and CD_REG (shown in FIG. 6) that temporarily store the control signals from the entertainment system 10 and the results of switching control performed by the communications controller 715C based on these control signals.

As shown in FIG. 5, communication between the entertainment system 10 and repeater 70 is performed using two communications systems A and B between the communications controller 18 of the entertainment system 10 and the control board 715 of the repeater 70. Specifically, controller communications system A includes controller connector 15 on the entertainment system 10 side and controller connector switcher 715A, while memory card communications system B includes card slot 16 on the entertainment system 10 side and the memory card slot switcher 715B. While controller communications system A is connected directly to the controller connector switcher 715A, the memory card communications system B is connected to the memory card slot switcher 715B via the communications controller 715C, so control signals output from the communications controller 18 of the entertainment system are introduced from the memory card communications system B into the repeater 70. Thus, since the controller communications system A and memory card communications system B are independently arranged in this manner, the cable 73 connecting the entertainment system 10 and repeater 70 is provided with a group of signal lines that make up these two communications systems A and B. In addition, in order for the controller connector 15 and card slot 16 of the entertainment system 10 to be connected simultaneously with the group of signal lines that make up these two communications systems A and B, the system-side connecting plug 75 (see FIGS. 2 and 3) includes both a controller communications plug 77 to be connected to the controller connector 15 and a memory communications plug 79 to be inserted into and connected to the card slot 16, formed as a unit.

Figure 6:
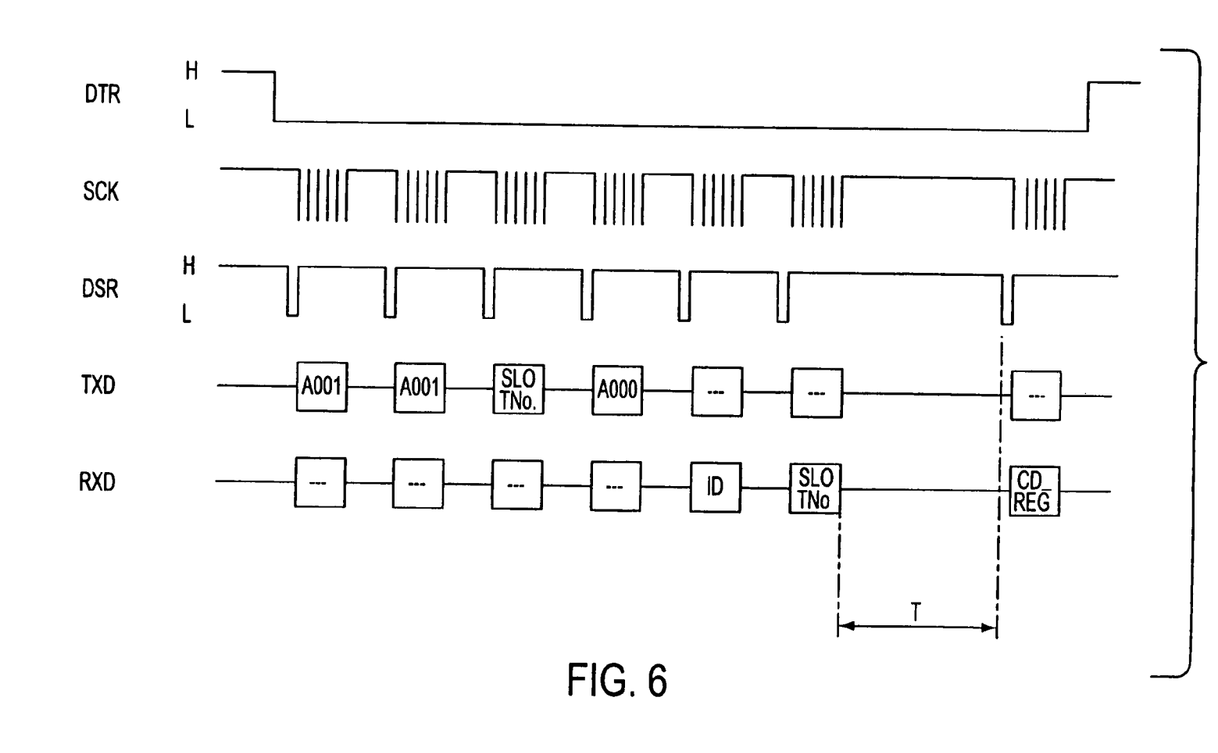
FIG. 6 is a timing chart for explaining the switching operation of the repeater of the present invention.

As shown in FIG. 6, the control signals input from the entertainment system 10 to the repeater 70 via the memory card communications system B consist of the data transmission start notification signal DTR, serial clock SCK and the transmitted data TXD. The response signals input from the repeater 70 to the entertainment system 10 via the memory card communications system B consist of the data transmission start consent signal DSR and the response data RXD. The communication of these signals between the entertainment system 10 and repeater 70 is performed such that, when the data transmission start notification signal DTR becomes Low, the communication between the entertainment system 10 and repeater 70 is started, and the data transmission start notification signal DTR is always Low during communication. Meanwhile, if the data transmission start notification signal DTR becomes High in the midst of communication, the communications controller 715C of the repeater 70 cancels the incomplete transmission and gets ready for the next communication.

The transmitted data TXD comprises a protocol including identification codes for identifying the object of control along with commands that perform control of said object of control, being output from the entertainment system 10 synchronized to the serial clock SCK at every byte. The response data RXD comprises identification codes for identifying the object of control processed in the transmitted data TXD along with result information that represents the results of control on the object of control, being output from the repeater 70 synchronized to the serial clock SCK at every byte in the same manner as the aforementioned transmitted data TXD. After the exchange of each byte of the aforementioned transmitted data TXD and response data RXD, the data transmission start consent signal DSR is a signal that notifies the entertainment system 10 as to whether or not preparations for sending or receiving the next byte are complete, and as shown in FIG. 6, when the repeater 70 has completed preparations for sending or receiving, the communications controller 715C outputs Low on the data transmission start consent signal DSR.

Commands to the communications controller 715C of the repeater 70 consist of portions of the transmitted data TXD supplied via the aforementioned memory card communications system B wherein the initial data takes a stipulated value (A001 in this embodiment). To wit, the communications controller 715C takes transmitted data TXD with initial data of A001 and returns it to the entertainment system 10, but all other transmitted data TXD is introduced into the memory card 50 connected to the card slot 713. In the event of transmitted data TXD with an initial data of A001 but the command number in the second byte is not a corresponding number, the communications controller 715C halts output of the data transmission start consent signal DSR and response data RXD to the entertainment system 10 at that time.

Commands included in the control signals output from the communications controller 18 of the entertainment system 10 and input to the communications controller 715C of the repeater 70 include get the number of controller connectors 711 and card slots 713 of the repeater 70, switch the controller connector switcher 715A and memory card slot switcher 715B, write data to the register CD_REG and write and read data corresponding to the registers SP_REG and CD_REG.

The switching operation of the repeater 70 based on control signals that include such commands, in reference to the timing chart of FIG. 6, shall now be described.

(1) Initial State and Reset

In the initial state after power on, the controller connector switcher 715A sets the controller connector 711 of Slot 0 (CSLOT0 in FIG. 5) into the state wherein it is connected to the entertainment system 10. If there is no communication from the entertainment system 10 for 100 ms or longer in the state wherein power is supplied to the repeater 70, namely, in the case that the data transmission start notification signal DTR in the controller connector 711 is High for 100 ms or longer, even if the controller connector 711 of another slot number is in the connected state, a switch is made to the state wherein Slot 0 is connected. In the event that Slot 0 is already selected, the switching operation is not performed. This state is the same as for the switching of the card slot 713 by the memory card slot switcher 715B.

(2) Switching of the Controller Connector 711

As shown in FIG. 6, first, the communications controller 18 of the entertainment system 10 outputs the identification code A001 as one byte of transmitted data TXD, and then outputs the identification code A001 which indicates the switching of the controller connector 711 as one byte of transmitted data TXD. Next, the communications controller 18 outputs the slot number of the controller connector 711 that is connected and able to communicate as one byte of transmitted data TXD, and then outputs the code A000 which indicates that signal output from the communications controller 18 is complete as one byte of transmitted data TXD. Upon receiving the aforementioned three bytes of transmitted data TXD, the communications controller 715C first outputs to the entertainment system 10 a code ID which indicates the repeater as one byte of response data RXD, and then outputs to the entertainment system 10 the slot number as one byte of response data RXD. After this response data RXD, based on the slot number included in the transmitted data TXD, the communications controller 715C outputs a switching control signal to the controller connector switcher 715A and causes the controller connector switcher 715A to maintain the connection status of the controller connector 711 according to said slot number. To wit, the switching of the controller connector 711 is executed during the period T in FIG. 6, and communication between the entertainment system 10 and the repeater 70 is not performed during this period. After confirming the completion of switching by the controller connector switcher 715A, the communications controller 715C outputs the data transmission start consent signal DSR to the entertainment system 10 and also outputs one byte of response data RXD that indicates whether or not the result of switching was good. As the response data RXD, if the process was successful, the content stored in register CD_REG is output. On the other hand, if the switching could not be done because the slot number is illegal, the code A006 is output as the response data RXD.

(3) Switching of the Card Slot 713

Fundamentally, the switching procedure is performed in the same manner as that of the controller connectors 711, but the identification code A002 which indicates the switching of the card slot 713 is output as the second byte of transmitted data TXD. The communications controller 715C outputs a switching control signal to the memory card slot switcher 715B based on this identification code A002.

With the above described embodiment of the present invention, control signals output from the entertainment system 10 are input to a repeater 70 via a memory card communications system B, enabling high-speed communications between the electronic equipment and repeater. Specifically, while the data rate between the electronic equipment and control terminal is a maximum of 500 kbps, by utilizing the memory card communications system B, it is possible to achieve high-speed communications at 24 Mbps. Accordingly, high-speed switching of the controller connector 711 and card slot 713 in the repeater 70 becomes possible.

In addition, communication is performed between the entertainment system 10 and repeater 70 via the memory card communications system B with a low data density, so communication can be performed efficiently therebetween. Namely, the controller communications system A is independent, so signals accompanying the operation of the control switches 32 of the controller 30 by the operator are input solely from controller communications system A to the communications controller 18. On the other hand, except for when the memory card communications system B is used to store the game progress in the memory card 50 or read out stored data, for example, the exchange of signals with the communications controller 18 is not performed via memory card communications system B, so the data density is lower than that of controller communications system A. Thus, by using the memory card communications system B with a low data rate to perform communication between the entertainment system 10 and repeater 70, it is possible to perform communication between the two efficiently without waste.

While the present invention has been described at some length and with some particularity with respect to the above noted embodiment, the invention is not limited to the above but includes other embodiments that can achieve the purposes of this invention.

For instance, while the system-side connecting plug 75 of the repeater 70 is constituted such that it can be connected simultaneously to the controller connector 15 and card slot 16 of the entertainment system 10, cables constituting the control terminal communications system and the external storage device communications system may be extended separately from the repeater, so that each cable can be connected separately to the respective controller connector and card slot of the entertainment system. In addition, while four controller connectors 711 and card slots 713 are provided on the repeater 70 in the described embodiment, repeaters may be provided with three or fewer or five or more controller connectors and card slots. Furthermore, while the present invention is adopted as a communications system between an entertainment system 10 and repeater 70, it may also be applicable as a communications system between a personal computer or the like and a repeater.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. An electronic equipment communications system comprising:
   electronic equipment,
   at least one controller,
   at least one memory card,
   a repeater, the repeater being connected to said at least one controller and said at least one memory card,
   a memory card communications system for performing communications between said at least one memory card and said electronic equipment via said repeater, and
   a controller communications system for performing communications between said at least one controller and said electronic equipment via said repeater, said controller communications system being arranged independent of said memory card communications system,
   wherein control signals for controlling the repeater are output from said electronic equipment and are input to said repeater via said memory card communications system.

2. An electronic equipment communications system in accordance with claim 1, wherein said repeater further comprises:
   at least one controller connector connected to said at least one controller,
   at least one memory card slot connected to said at least one memory card and corresponding to said at least one controller connector,
   a controller connection switcher capable of selecting one of said at least one controller connector and permitting communications between said selected controller connector and said electronic equipment,
   a memory card slot switcher capable of selecting one of said at least one memory card and permitting communications between said selected memory card and said electronic equipment, and
   a communications controller that, based on a control signal from said electronic equipment, outputs a switching control signal to said controller connection switcher and said memory card slot switcher.

3. A repeater comprising:
   a plurality of controller connectors to which controllers are connected,
   a plurality of memory card slots adapted to correspond to said plurality of controller connectors and to which memory cards are connected, and
   a system connection terminal adapted for connection to electronic equipment and that permits communication between connected controllers and connected memory cards with said electronic equipment,
   wherein communication between said plurality of controller connectors and said electronic equipment through a controller communication system occurs independent of communication between said plurality of memory cards and said electronic equipment through a memory card communication system,
   wherein control signals for controlling the repeater are output from said electronic equipment and are input to said repeater via said memory card communications system.

4. A repeater in accordance with claim 3, further comprising:
   a controller connection switcher that permits communication between said electronic equipment and a controller connected to a controller connector selected from said plurality of controller connectors,
   an memory card slot switcher that permits communications between said electronic equipment and an memory card connected to an memory card slot selected from said plurality of memory card slots, and
   a communications controller that outputs a switching control signal to said controller connection switcher and said memory card slot switcher,
   wherein the control signals output from said electronic equipment are input to said communications controller.

5. Electronic equipment comprising:
   a controller connector to which a controller is connected;
   a memory card slot to which a memory card is connected; and
   a repeater to which is connected a plurality of controllers and a plurality of memory cards, the repeater comprising an operation terminal communication system for communicating with a controller and a memory card communication system for communicating with the memory card, the operation terminal communication system and the memory card communication system communicating independent of each other;
   wherein said repeater is controlled based on a control signal output from said memory card slot.

6. A computer-readable medium having stored thereon computer executable instructions for causing a computer control system to manage communications between said computer control system and a repeater control system where a plurality of controllers and a plurality of memory cards may be connected to said repeater control system, the communications is managed by performing the steps of:
   a. signaling from said computer control system a data transmission start notification;
   b. signaling from said repeater control system a consent to begin transmission;
   c. providing a synchronizing clock signal for synchronizing transmission and reception of data;
   d. transmitting data to said repeater control system on an operation terminal communication system for communicating with an operation terminal and on a memory card communication system for communicating with a memory card, the operation terminal communication system and the memory card communication system being independent of each other, said data including identification codes for identifying an object of control and commands for performing control of said object of control; and
   e. transmitting response data to said computer control system, said response data including identification codes for identifying an object of control and results of control on said object of control, wherein the object of control comprises at least one of said repeater control system, said plurality of controllers and/or said plurality of memory cards, and wherein control signals for controlling said repeater control system are input to said repeater control system via said memory card communication system.

7. A method for managing communications between a computer control system and a repeater control system, said repeater control system having a plurality of slots for connecting controllers and memory cards, comprising the steps of:

a. signaling from said computer control system a data transmission start notification;

b. signaling from said repeater control system a consent to begin transmission;

c. providing a synchronizing clock signal for synchronizing transmission and reception of data;

d. transmitting data to said repeater control system on an operation terminal communication system for communicating with an operation terminal and on a memory card communication system for communicating with a memory card, the operation terminal communication system and the memory card communication system being independent of each other, said data including identification codes for identifying an object of control and commands for performing control of said the object of control; and    e. transmitting response data to said computer control system, said response data including identification codes for identifying an object of control and results of control on said object of control, wherein the object of control comprises at least one of said repeater control system, said plurality of controllers and/or said plurality of memory cards, and wherein control signals for controlling said repeater control system are input to said repeater control system via said memory card communication system.

\* \* \* \* \*